United States Patent [19]

Rupp et al.

[11] 4,117,919

[45] Oct. 3, 1978

[54] CENTRIFUGAL DISK SEPARATION DEVICE FOR A DISK CLUTCH

[75] Inventors: Ludwig Rupp, Ravensburg; Hubert Mayer, Friedrichshafen, both of Fed. Rep. of Germany

[73] Assignee: Motoren- und Turbinen-Union Friedrichshafen GmbH, Fed. Rep. of Germany

[21] Appl. No.: 758,429

[22] Filed: Jan. 11, 1977

[30] Foreign Application Priority Data

Jan. 16, 1976 [DE] Fed. Rep. of Germany ....... 2601507

[51] Int. Cl.² .............................................. F16D 13/69
[52] U.S. Cl. ............................ 192/103 A; 192/104 R; 192/70.23; 192/106 R
[58] Field of Search ............ 192/104 R, 103 A, 70.23, 192/70.28, 101, 106 R

[56] References Cited

U.S. PATENT DOCUMENTS

| | | | |
|---|---|---|---|
| 1,167,850 | 1/1916 | Smith | 192/104 R |
| 2,154,591 | 4/1939 | Waseige | 192/104 R |
| 2,587,712 | 4/1952 | Dodge | 192/103 A |
| 3,472,348 | 10/1969 | Hipert | 192/104 R |

*Primary Examiner*—Benjamin W. Wyche
*Attorney, Agent, or Firm*—Craig & Antonelli

[57] ABSTRACT

An arrangement is provided for forcing and holding apart the disks of a disengaged disk clutch of the type having disks supports with disks rotatably fixed thereto and axially moveable thereon. This apparatus includes centrifugal weights disposed between like disks, which weights are forced radially inwardly by the disks when in the clutched engaged positions, and which disks are moveable radially outwardly by centrifugal forces to press the like disks apart by a predetermined amount when the disks are in a clutched disengaged position. In preferred embodiments, the centrifugal weights are construed as ball members, with a plurality of such ball members disposed between the inner clutch disks and guided for movement by a bore in the inner disk support, while a further set of balls for the outer disk are provided, which are guided by bores through the outer disk, with radial outward limit stops being formed by the outer disk support.

12 Claims, 7 Drawing Figures

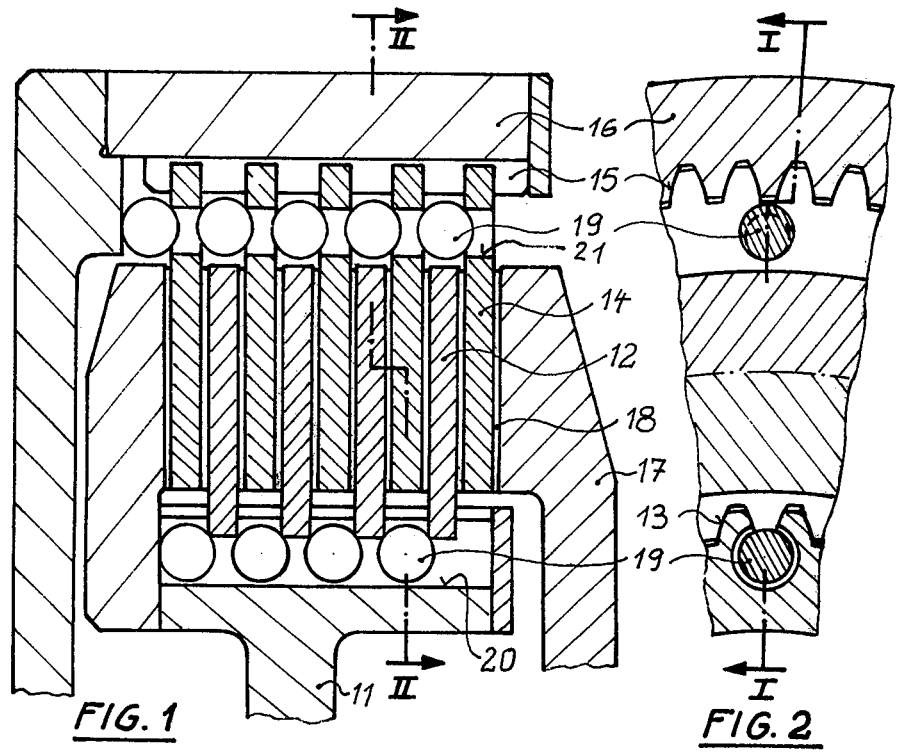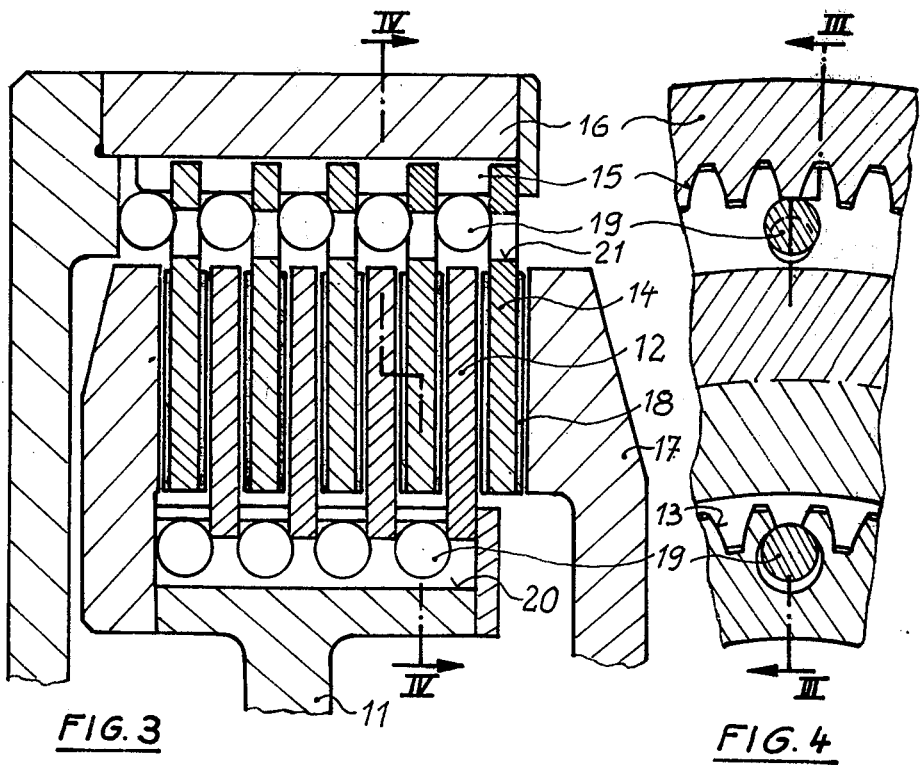

CENTRIFUGAL DISK SEPARATION DEVICE FOR A DISK CLUTCH

BACKGROUND AND SUMMARY OF THE INVENTION

The invention relates to a device for pressing and holding apart the disengaged disks of a disk clutch of the type having clutch disks fixed in rotation yet axially movable on disk supports.

The purpose of the invention is to prevent the clutch disks from clinging to each other when the clutch is disengaged, and also to prevent wobbling, along with the accompanying residual torque, output losses, heating and wear.

To loosen the disks from each other, it has been contemplated to provide that the inner clutch disks are corrugated. Thereby these inner clutch disks act like spring elements that are pressed flat in engagement, and in disengagement effect a lifting off of the other disks. In large clutches with long disengaged operation, as for example in double clutches for two different drive directions of rotation, and with a sloped incorporation of the clutch, such corrugated elevations of the inner disks continuously scrape on the outer disks, become heated and deteriorate. Also, the wobbling of the disks in disengagement that evokes the transmitted residual torque for the most part is not prevented with this arrangement.

It has also been contemplated to provide that like disks are pressed apart by spring force in disengagement, Difficulties arise with such arrangements because of the necessary precise mutual adjustment of the spring elements by fixing the spring elements on their place of incorporation and by uniform limiting of the path of the spring of the respective spring elements when the gap between the disks has become sufficiently large, from the pressing apart.

The invention is addressed to the problem of forcing like disks apart when the clutch is disengaged, up to a precisely defined amount. This problem is solved in that centrifugal weights are disposed between like disks, which weights in disengagement are moved radially outward to a stop, by the centrifugal force that acts upon them, thereby forcing the disks apart by a predetermined amount, and in the compression of the disks that is required for engagement are forced radially inward by said disks.

An advantageous embodiment of the invention provides that the centrifugal weights are constituted by balls disposed, for the inner disks, in axially directed bores in the support of the inner disks, between said inner disks, whereby the path of the balls is defined by the walls of said bores. Just with these measures, a uniform forcing apart of the clutch disks in disengagement results. With sloping position of the clutch, each respective outer disk is pressed only by its own weight against the corresponding inner disk.

According to a further feature of preferred embodiments with further balls held by bores through the outer disks, there is a further reduction of residual torque because the outer disks are also forced apart by the further balls.

Aside from the simple use of balls as centrifugal weights, the present invention contemplates other embodiments with centrifugal weight bodies of other suitable configuration such as disks that are symmetrical in rotation, and connected to one another by a shaft.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 1 is a partial longitudinal sectional view through a clutch disk packet with disk separation apparatus constructed in accordance with the present invention, and showing the clutch disks in the engaged position;

FIG. 2 is a sectional view taken along line I—I of FIG. 1;

FIG. 3 is a view similar to FIG. 1, except the apparatus is shown with the clutch disks in the clutch disengaged position;

FIG. 4 is a sectional view taken along line IV—IV of FIG. 3;

DETAILED DESCRIPTION OF THE DRAWINGS

Figures 5, 7:
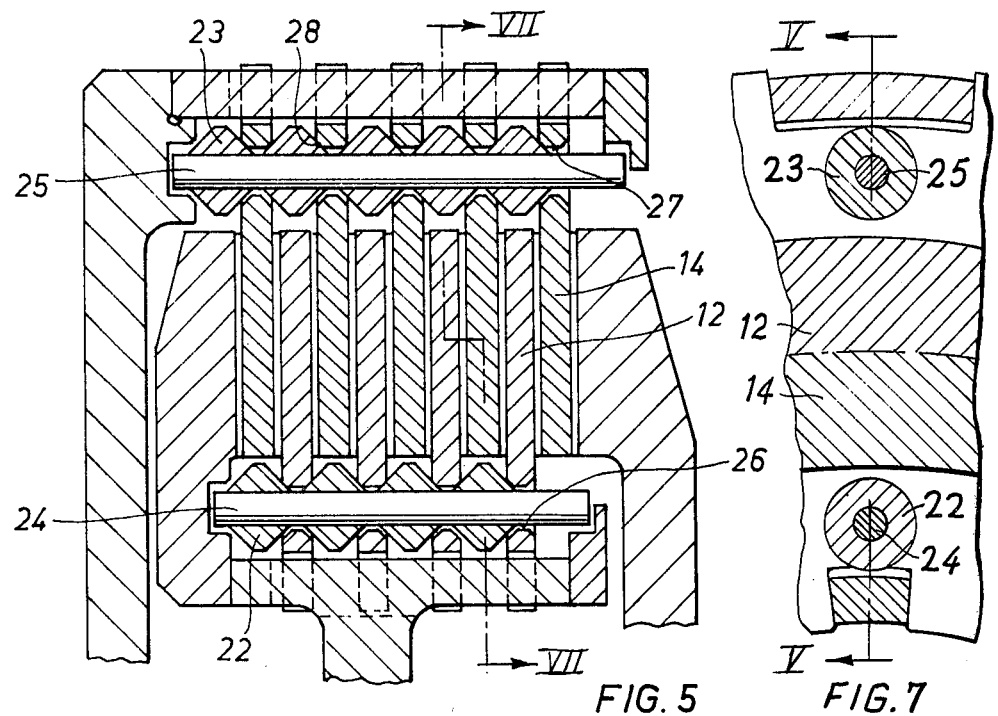
FIG. 5 is a partial longitudinal sectional view through a clutch disk packet with disk separation apparatus constructed in accordance with another preferred embodiment of the present invention, and showing the clutch disk in the engaged position.
FIG. 7 is a sectional view taken along line VII—VII of FIG. 5.

Referring to the drawings, wherein like reference numerals depict like features throughout the figures, a portion of inner disk support 11 is shown which is rotatably driven by a drive mechanism that is not illustrated. Inner disks 12 are connected via a toothed arrangement 13 with the inner disk support 11 so as to be fixed in rotation with disk support 11 yet axially movable along support disk 11. The torque which is transmitted to the inner disk support 11 is transmitable via toothed device 13 and inner disks 12 to outer disks 14, another toothed device 15 and an outer disk support 16. For this purpose the disks are pressed together via a movable pressure piece 17. Friction plates 18 that are fixedly connected with outer disks 14 for example produce a high friction coefficient between outer and inner disks, whereby torque transmission occurs at a specific force of application.

Between like disks, centrifugal weights are disposed, made as balls 19, in the illustrated embodiment. The balls 19 between inner disks 12 are disposed in a plurality of bores 20 in inner disk support 11 (the bores 20) distributed uniformly about the periphery and directed axially, which balls 19 with clutch engagement (FIGS. 1 and 2) are forced inward by inner disks 12, and in disengagement of the clutch (FIGS. 3 and 4), because of the centrifugal force acting on them, separate the inner disks 12 from each other until the path of said balls 19 is limited by the walls of the bores 20 (see FIG. 3) and the axial clearance or spacing provided for the inner disks 12 is uniform with reference to the individual disks.

Balls 19 disposed between outer disks 14 act similarly as described above for the inner disks separation. The position of the balls 19 at the outer disks is determined by bores 21 in the outer disks. When outer disks 14 are forced apart by centrifugal action and balls 19 causing the balls to press against outer disks 14, the ball path radially outward is limited by toothed arrangement 15 of outer disk support 16 (see FIGS. 3 and 4).

Figure 6:
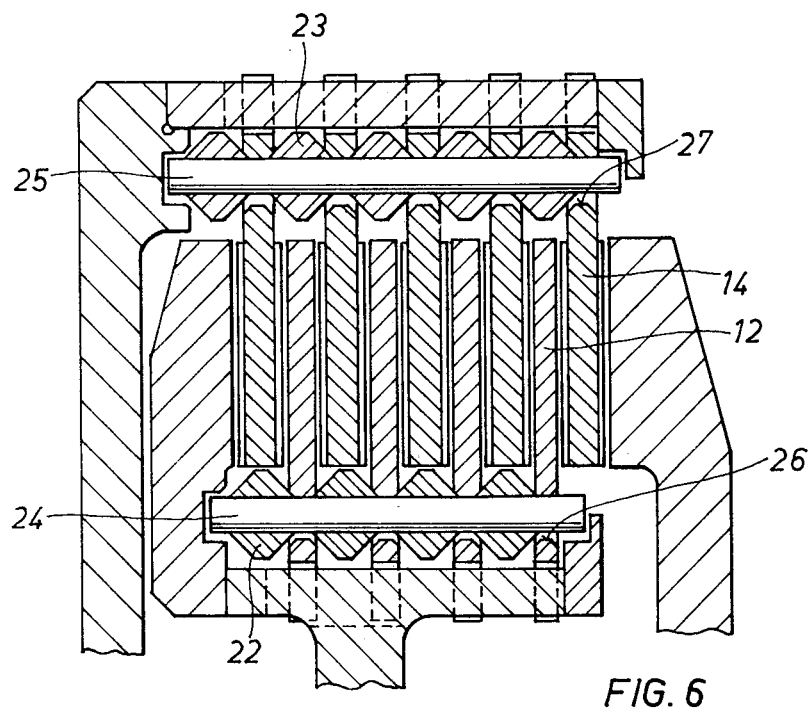
FIG. 6 is a view similar to FIG. 5, except the apparatus is shown with the clutch disks in the clutch disengaged position.

FIGS. 5 and 6 show a further preferred embodiment of the invention. In this embodiment, the centrifugal weights are fashioned as rotationally symmetrical plates 22 and 23, respectively. These plates 22, 23 are provided with bores and are connected to each other respectively by shafts 24 and 25 extending through the bores. The position of the shafts 24 and 25, respectively, is fixed by means of aligned bores 26 in the inner disk 12 and by aligned bores 27 in the outer disk 14, respectively. In the engaged condition (FIG. 5), the plates 22 are urged inwardly by the inner disk 12 and the plates 23 are urged inwardly by the outer disks 14. In the disengaged condition (FIG. 6), the plates 22 separate the inner disks and the plates 23 separate the outer disks 14 on account of the centrifugal forces effective on the plates and on account of the inclined surfaces 28 provided at the plates and at the disks. In this embodiment, the outwardly effective force of the plates is supported by the centrifugal force effective on the shaft. The movement of the centrifugal weights and of the shaft is limited by the walls of the aligned bores 26 and 27, respectively, in the individual disks.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Apparatus for forcing and holding apart the disks of a disengaged disk clutch of the type having disk supports with disks rotatably fixed thereto and axially movable thereon, said apparatus comprising:
    a plurality of separately movable axially spaced centrifugal weight means, at least two of said weight means disposed between adjacent like disks during both a clutch engaged position and a clutch disengaged position;
    and means for guiding said weight means to move by centrifugal force acting thereon to force the like disks apart by a predetermined amount when said disks are in the clutch disengaged position.

2. Apparatus according to claim 1, wherein said weight means are configured and disposed so as to be forced radially inward toward a clutch rotational axis when the like disks are axially compressed to their respective clutch engaged positions.

3. Apparatus according to claim 2, wherein said weight means are balls.

4. Apparatus according to claim 2, wherein radially outward stop means are provided for limiting the radial outward movement of said weight means.

5. Apparatus for forcing and holding apart the disks of a disengaged disk clutch of the type having disk supports with disks rotatably fixed thereto and axially movable thereon; said apparatus comprising:
    centrifugal weight means disposed between like disks;
    and means for guiding said weight means to move by centrifugal force acting thereon to force the like disks apart by a predetermined amount when said disks are in a clutch disengaged position,
    wherein said weight means are configured and disposed so as to be forced radially inward toward a clutch rotational axis when the like disks are axially compressed to their respective clutch engaged positions,
    wherein said weight means are balls, and
    wherein said disks include a set of like inner clutch disks carried by an inner disk support, and wherein a plurality of said balls are disposed between said inner clutch disks in axially directed bores in the inner disk support, whereby the path of the balls is limited by the walls of said bores.

6. Apparatus for forcing and holding apart the disks of a disengaged disk clutch of the type having disk supports with disks rotatably fixed thereto and axially movable thereon; said apparatus comprising:
    centrifugal weight means disposed between like disks;
    and means for guiding said weight means to move by centrifugal force acting thereon to force the like disks apart by a predetermined amount when said disks are in a clutch disengaged position,
    wherein said weight means are configured and disposed so as to be forced radially inward toward a clutch rotational axis when the like disks are axially compressed to their respective clutch engaged positions,
    wherein said weight means are balls, and
    wherein said like disks include a set of like outer clutch disks carried by an outer disk support, and wherein a plurality of said balls are disposed between said outer clutch disks with the position of said balls being determined by bores in the outer clutch disks.

7. Apparatus according to claim 6, wherein the outward radial path of the balls between the outer clutch disks is limited by the outer disk support.

8. Apparatus according to claim 7, wherein said disks include a set of like inner clutch disks carried by an inner disk support, and wherein a plurality of said balls are disposed between said inner clutch disks in axially directed bores in the inner disk support, whereby the path of the balls is limited by the walls of said bores.

9. Apparatus for forcing and holding apart the disks of a disengaged disk clutch of the type having disk supports with disks rotatably fixed thereto and axially movable thereon; said apparatus comprising:
    centrifugal weight means disposed between like disks;
    and means for guiding said weight means to move by centrifugal force acting thereon to force the like disks apart by a predetermined amount when said disks are in a clutch disengaged position,
    wherein said weight means are configured and disposed so as to be forced radially inward toward a clutch rotational axis when the like disks are axially compressed to their respective clutch engaged positions, and
    wherein said weight means include a plurality of centrifugal weight members having bores therein, wherein a connecting shaft is provided at said bores for connecting said weight members to one another with a weight member disposed in each of a plurality of respective spaces between axially adjacent like disks, and wherein means for guiding the weight means are directly engageable with said connecting shaft.

10. Apparatus according to claim 9, wherein said disks include a set of like inner clutch disks carried by an inner disk support, and wherein bores in the inner disk support serve as said means for guiding.

11. Apparatus according to claim 9, wherein said disks include a set of like outer clutch disks carried by an outer disk support, and wherein bores in the outer clutch disks serve as said means for guiding.

12. Apparatus according to claim 9, wherein said weight means are rotationally symmetrical disks.

* * * * *